Dec. 28, 1937.  E. JANETSCHKE  2,103,786
ELECTRICAL CONVERSION SYSTEM
Filed April 25, 1935  2 Sheets-Sheet 1

WITNESSES:
O. A. McCloskey
S. A. Strickler

INVENTOR
Erwin Janetschke
BY O. B. Buchanan
ATTORNEY

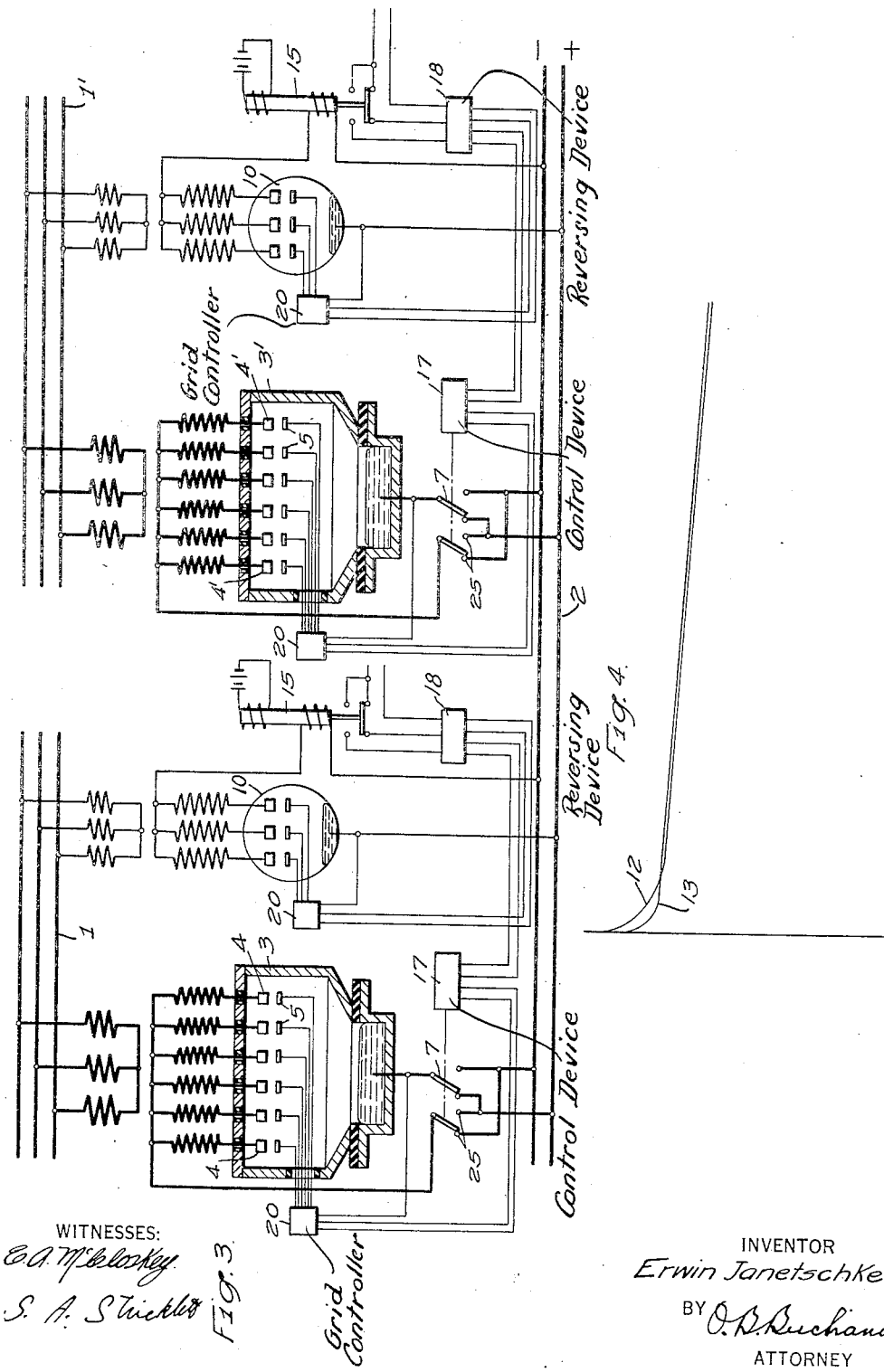

Patented Dec. 28, 1937

2,103,786

UNITED STATES PATENT OFFICE 2,103,786

ELECTRICAL CONVERSION SYSTEM

Erwin Janetschke, Berlin-Charlottenburg, Germany, assignor to Westinghouse Electric & Manufacturing Company, East Pittsburgh, Pa., a corporation of Pennsylvania Application April 25, 1935, Serial No. 18,095
In Germany April 26, 1934

4 Claims. (Cl. 171—97)

My invention relates to an electrical conversion system, and particularly to a valve type converting system for transferring energy in either direction between an alternating current circuit and a direct current circuit.

In the application of valve type converters for transferring energy between an alternating current circuit and a direct current circuit, it is frequently desirable to be able to reverse the direction of energy transfer in the converter for conserving surplus energy generated in whichever of said circuits is nominally the load circuit.

My invention, therefore, relates to an electric converter installation in which energy translating devices such as railway motors, steel mill motors, or elevators, etc., are energized from an alternating current circuit through valve type converters and in which the converters are to be automatically reversed to operate as inverters for the purpose of energy recuperation.

My invention is also useful in those converter installations in which energy is transferred between two alternating current circuits of the same or different frequency with an intermediate direct current transmission.

Several systems have heretofore been proposed for controlling valve type converters so that direction of energy transfer could be automatically governed according to the load condition of one or both of the connected systems. The system according to my present invention is one in which the energy reversal is made dependent on an auxiliary converter which is connected in parallel with the main converter which is changed from rectifier to inverter operation in response to the load condition of the connected circuits.

The auxiliary converter may be designated as a "pilot converter" and its control is such that its voltage current characteristic is relatively displaced with respect to the voltage current characteristic of the main current converter. The pilot converter will, therefore, reach the operating condition at which a change must be made at a different time than does the main converter. The reversal of the main converter can, therefore, be made in accordance with one of the operating values such as the current value of the pilot converter.

One method for changing the connections of the main converter may, for instance, be based on the fact that the low load rectifier potential of the pilot converter is higher than that of the main converter. The current will, therefore, still traverse the pilot converter after the main converter has ceased to carry any current. The reversing relay connected in the circuit of the control converter may then be made in the form of a minimum current relay which will operate when the current in the current converter falls below a certain predetermined value. The operation of this relay may directly cause or initiate the reversal of connections of the main converter so that with increase of the direct current potential, the main converter will operate as an inverter to delivery energy from the direct current circuit to the alternating current circuit.

Other objects and advantages of my invention will be apparent from the following detailed description taken in conjunction with the accompanying drawings in which:

Fig. 3 is a schematic illustration of a frequency converting system utilizing direct current transmission between the valve type converters, and Fig. 4 is a current voltage diagram of a main and pilot converter suitable for my conversion system.

Figure 1:
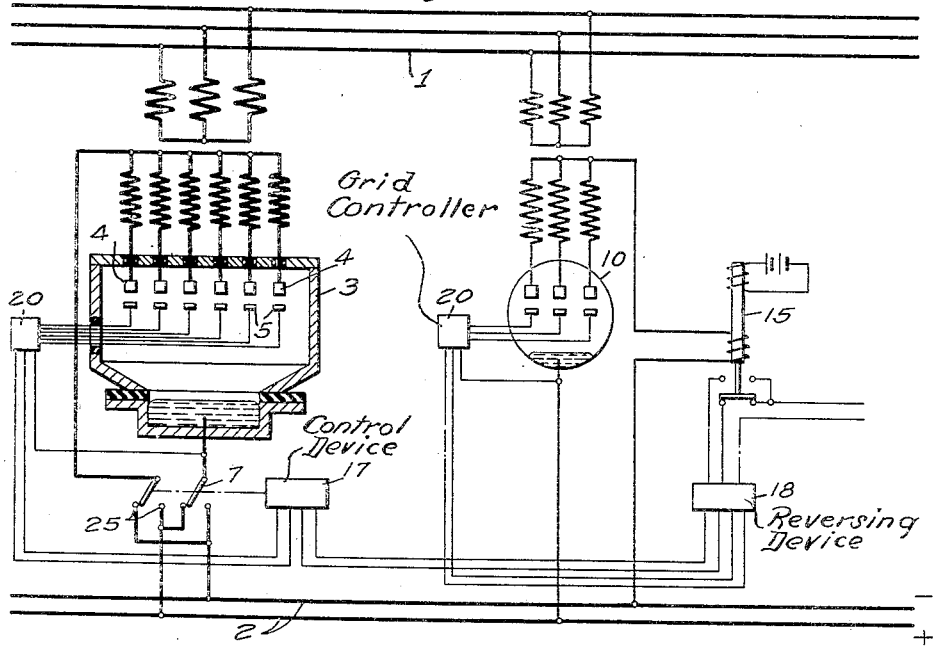
Figure 1 is a schematic illustration of a conversion system according to my invention.

In the system according to my invention an alternating current circuit 1 is connected to a direct current circuit 2 by means of a suitable valve type converter 3 preferably the individual valves 4 of the valve type converter 3 are provided with control elements such as grids 5 for controlling the amount of energy transfer by the converter. Also, a switching system 7 is provided for reversing the polarity of the potentials applied to the terminals of the converter 3 in such manner that the converter 3 may deliver energy in either direction between the alternating current and direct current circuits.

Connected in parallel with the main converter 3 is an auxiliary grid controlled converter 10 which operates as a control or pilot converter for determining the direction of energy transfer in the main converter 3.

The pilot converter 10 has a voltage current characteristic 12 displaced or different from the voltage current characteristic 13 of the main converter 3 in such a manner that at very light loads of the conversion system substantially all of the light load current will flow in the pilot converter 10 which must therefore have sufficient current capacity to deliver the light load demands of the conversion system.

A suitable relay such as a minimum current relay 15 is connected with the load circuit of the pilot converter in such manner that when there is heavy rectifier demand on the conversion system the relay 15 will be closed in one direction so that the main converter 3 will be actuated by a controller 17 governed by the minimum current relay 15 in such a manner that it will deliver current from the alternating current system 1 to the direct current system 2. However, as the load demand of the direct current system 2 decreases the load current of the main and pilot converters will decrease, thus as indicated by the voltage current characteristics the load will shift from the main converter 3 to the pilot converter 10, so that at very light load substantially all of the current will be flowing in the pilot converter 10.

When this light load current reaches a certain predetermined low value the minimum current relay 15 will operate to actuate reversing device 18 for the control mechanism 20 and reversing switch 7 of the main converter 3 to such a position that the main converter 3 will be in condition to deliver current from the direct current circuit 2 to the alternating current circuit 1. In this condition if the energy is available in the direct current circuit 2, energy will be transferred to the alternating current circuit 1 enabling the motors of the direct current circuit 2 to be used for regenerative braking etc.

As long as the potential of the direct current circuit 2 is at a suitably high value there will be very little current traversing the pilot converter 10 so that the minimum current relay 15 will be held in its open position. However, it is sometimes desirable to change the grid control 20 of the pilot converter 10 in such a manner that as long as the energy transfer is from the direct current circuit 2 to the alternating current circuit 1, the energy delivered by the pilot converter 10 will be constantly below the minimum value necessary to operate the control relay 15. However, when load demands again appear on the direct current circuit 1 the pilot converter 10 will attempt to supply the demand and supply sufficient current to operate the minimum current relay 15 which again actuates the control mechanism 18 of the main converter 3 so that it is placed in condition to deliver current from the alternating current circuit 1 to the direct current circuit 2.

Figure 2:
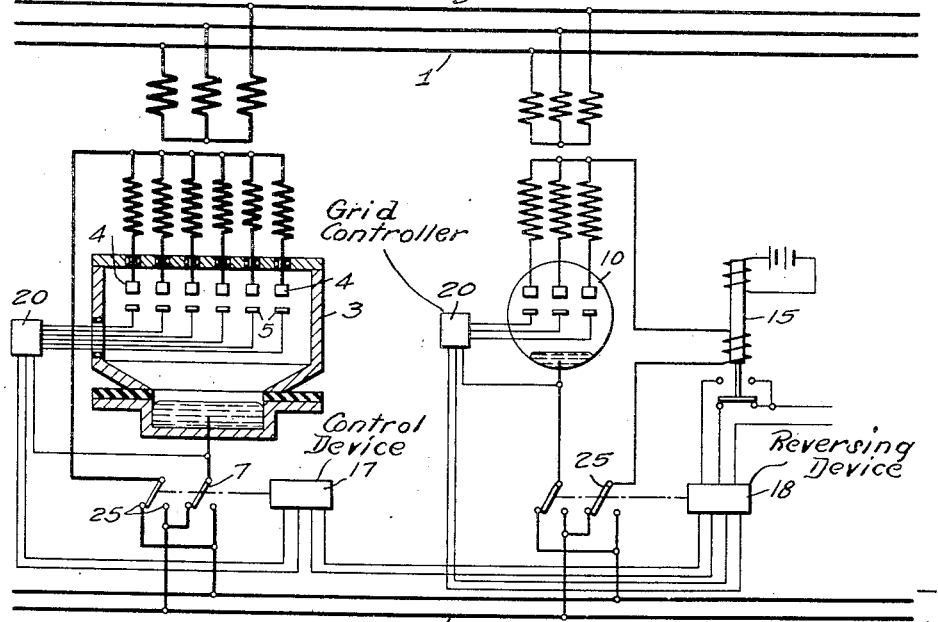
Fig. 2 is a similar illustration of a modification in which both the pilot converter and the main converter are changed in response to the load conditions of the connected systems.

In certain applications, it is desirable to reverse both the pilot converter 10 and the main converter 3 not only to conserve the energy which would otherwise circulate through the pilot converter 10 but to secure more sensitive control by means of the pilot converter 10. In such applications the reversing mechanism 18 actuated by the minimum current relay may also reverse the polarity connections 25 and grid control elements 20 of the pilot converter 10. Such a system is illustrated in Fig. 2.

When the pilot converter 10 is reversed along with the main converter 3, care must be taken to assure that the minimum current relay 15 will not be operated by the reverse current delivered by the pilot converter 10. The relay 15 itself may be polarized for this purpose or the control system 20 of the pilot converter 10 may be so adjusted that only a minimum current will flow from the direct current circuit 2 to the alternating current circuit 1.

In the modification according to Fig. 3, two substantially similar converters 3—3' are utilized with an interconnection of a direct current circuit 2. The direct current circuit 2 may, of course, be of any desired length. If the two alternating current circuit systems 1—1' are in immediate proximity to each other the direct current circuit 2 may be a direct linkage from the terminals of one converter 3 to the terminals of another 3', or, if desired, the interconnection 2 may be of such length as to be a direct current transmission system. Also, with such circuits it is possible to supply energy to any or all of the interconnected circuits 1—2—1' and also to connect a load to any or all of the said circuits 1—2—1', energy being supplied from any circuit to any of the other circuits as the instantaneous load characteristics may demand.

While, for purposes of illustration, I have shown and described specific embodiments of my invention, it will be apparent to those skilled in the art that many changes and modifications may be made therein without departing from the true spirit of my invention and the scope of the appended claims.

I claim as my invention:

1. A reversible electric current converting system for transferring power between alternating current systems, comprising a main valve type converter for transferring power between the systems, an auxiliary valve type converter connected between said systems, said auxiliary converter having a regulation characteristic differing from that of the main converter in such a manner that at light loads the load is transferred from the main converter to the auxiliary converter, a reversing mechanism connected to said main converter, and a relay responsive to the load condition of said auxiliary converter for determining the position of said reversing mechanism.

2. A reversible electric current converting system comprising a main grid controlled converter, an alternating current circuit and a direct current circuit connected to said main converter, a grid controlled pilot converter connected to said alternating and direct current circuits, means for controlling the direction of energy flow through said main converter, a minimum current relay responsive to the current in said pilot converter for operating said directional control means, said pilot converter having a current-voltage characteristic so related to the current voltage characteristics of said main converter in such manner that at light loads the pilot converter assumes the energy transfer between the circuit.

3. A reversible electric current converting system comprising an alternating current circuit, a direct current circuit, a main valve type converter for transferring energy between said circuits, a control device for determining the direction of energy transfer by said main converter, an auxiliary valve type converter connected between said circuits, said auxiliary converter having sufficient capacity to carry the light load energy transfer between said circuits, said auxiliary converter having a current voltage characteristic so related to the current voltage characteristic of the main converter that below predetermined load values the auxiliary converter assumes the transfer load and relay means responsive to the load condition of said auxiliary converter for operating the control device for said main converter.

4. A reversible electric current transmitting system comprising two alternating current circuits, an intermediate direct current circuit, main valve type converters connected between said direct current circuit and the respective alternating current circuits, an auxiliary valve type converter connected in parallel with each of said main converters said auxiliary converters being of less capacity than said main converters but having sufficient capacity to carry the light load energy transfer between said circuits, said auxiliary converters having current-voltage characteristics such that at normal energy transfer, the main converters assume the load at low energy transfer, the auxiliary converters assume the load, switching means for reversing the terminal connections of said main converters and means responsive to the load conditions of said auxiliary converter for determining the operation of said switching means.

ERWIN JANETSCHKE.